(12) United States Patent
Waltenberger (10) Patent No.: US 8,595,610 B2
(45) Date of Patent: Nov. 26, 2013

(54) METHOD, SOFTWARE AND COMPUTER SYSTEM FOR MANIPULATING AGGREGATED DATA

(75) Inventor: Helmut Waltenberger, Geretsried (DE)

(73) Assignee: Infineon Technologies AG, Neubiberg (DE)

( * ) Notice: Subject to any disclaimer, the term of this patent is extended or adjusted under 35 U.S.C. 154(b) by 33 days.

(21) Appl. No.: 13/013,781

(22) Filed: Jan. 25, 2011

(65) Prior Publication Data

US 2012/0192053 A1 Jul. 26, 2012

(51) Int. Cl.
G06F 17/00 (2006.01)

(52) U.S. Cl.
USPC .......................................... 715/227; 715/212

(58) Field of Classification Search
USPC .................. 715/227, 212, 219–220, 200
See application file for complete search history.

(56) References Cited

U.S. PATENT DOCUMENTS

| | | | | |
|---|---|---|---|---|
| 5,499,180 A | * | 3/1996 | Ammirato et al. | 715/204 |
| 5,615,367 A | * | 3/1997 | Bennett et al. | 1/1 |
| 6,157,934 A | * | 12/2000 | Khan et al. | 715/234 |
| 6,411,959 B1 | * | 6/2002 | Kelsey | 1/1 |
| 6,626,959 B1 | * | 9/2003 | Moise et al. | 715/210 |
| 6,701,485 B1 | * | 3/2004 | Igra et al. | 715/210 |
| 6,707,454 B1 | * | 3/2004 | Barg et al. | 345/440 |
| 7,058,621 B1 | * | 6/2006 | Wolge | 1/1 |
| 8,127,223 B2 | * | 2/2012 | Becerra et al. | 715/212 |
| 8,140,958 B2 | * | 3/2012 | Garrett et al. | 715/212 |
| 2002/0184260 A1 | * | 12/2002 | Martin et al. | 707/503 |
| 2006/0004750 A1 | * | 1/2006 | Huang et al. | 707/6 |
| 2006/0167924 A1 | * | 7/2006 | Bradlee et al. | 707/102 |
| 2007/0260578 A1 | * | 11/2007 | Ghosh | 707/2 |
| 2009/0276692 A1 | * | 11/2009 | Rosner | 715/227 |

OTHER PUBLICATIONS

Pivot4u, Pivot4U Example, Jan. 26, 2010, Pivot4U, pp. 1-5 (pdf).*
Pivot 4U Spreadsheet, http://pivot4u.com/documents/download.html.
"Editable Pivot Tables—Mission is Possible with Pivot4U add-in for Microsoft Excel"; http://prweb.com/releases/pivot4u/pivot/prweb2593284.htm.
"Pivot4U 1.3", Free Downloads Center; http://freedownloadscenter.com/Business/MS_Office_Add-ins/Pivot4U.html.

* cited by examiner

*Primary Examiner* — Manglesh M Patel
(74) *Attorney, Agent, or Firm* — Murphy, Bilak & Homiller, PLLC (57) ABSTRACT

A collection of data includes a plurality of records having values assigned to different fields, each field corresponding to an attribute of the data. The data is manipulated by importing the data into an application that displays the data and generating a first table via the application, the first table including content which summarizes at least a portion of the data based on one or more of the fields. A second table is generated from the first table, and content of the second table is modified independent of the first table. The data imported into the application is automatically revised based on the modifications made to the content of the second table so that the data imported into the application incorporates the modifications.

23 Claims, 12 Drawing Sheets

| | Project Name | WorkPackage | Location | Pool | Dept | LastName | Skill | MM | Month |
|---|---|---|---|---|---|---|---|---|---|
| 1 | WURGL | P Flash | NRW | ATV_EPOS_NRW | EPOS MS | Lammers | CD-MS | 0.5 | 7/1/2009 |
| 2 | WURGL | P Flash | MUC | ATV_OPP_MUC_AT | FAG ATV A | Krug | PD-LMS | 0.25 | 7/1/2009 |
| 3 | WURGL | S2 Preparation | XI | ATV_MC_XI_DE | IFCX WLS RI | Lan | CD-DFV | 0.5 | 8/1/2009 |
| 4 | WURGL | S2 Preparation | XI | ATV_MC_XI_DE | IFCX WLS RI | Li | PD-LPS | 0.2 | 8/1/2009 |
| 5 | WURGL | P Flash | NRW | ATV_EPOS_NRW | EPOS MS | Lammers | CD-MS | 0.7 | 8/1/2009 |
| 6 | WURGL | P Flash | NRW | ATV_EPOS_NRW | EPOS MS | Lammers | CD-MS | 0.7 | 9/1/2009 |
| 7 | WURGL | P Flash | NRW | ATV_EPOS_NRW | EPOS MS | Dollberg | CD-MS | 0.5 | 9/1/2009 |
| 8 | WURGL | S3 Preparation | SIN | ATV_MC_SIN_ACS | IFAP DC AT | Ang | CE | 0.5 | 9/1/2009 |
| 9 | WURGL | S3 Preparation | SIN | ATV_MC_SIN_ACS | IFAP DC AT | Lim | CE | 0.4 | 9/1/2009 |
| 10 | WURGL | S3 Preparation | MUC | ATV_MC_MUC_ACE | FAG ATV M | Siebert | CE | 0.25 | 9/1/2009 |
| 11 | WURGL | S3 Preparation | SIN | ATV_MC_SIN_ACS | IFAP DC AT | Wong | CE | 0.2 | 9/1/2009 |
| 12 | WURGL | S3 Preparation | XI | ATV_MC_XI_DE | IFCX WLS RI | Lan | CD-DFV | 1 | 9/1/2009 |
| 13 | WURGL | S3 Preparation | MUC | ATV_MC_MUC_ACE | FAG ATV M | Syassen | CE | 0.3 | 9/1/2009 |
| 14 | WURGL | S3 Preparation | XI | ATV_MC_XI_DE | IFCX WLS RI | Feng | CD-DFV | 0.5 | 9/1/2009 |
| 15 | WURGL | S3 Preparation | XI | ATV_MC_XI_DE | IFCX WLS RI | Li | PD-LPS | 0.2 | 9/1/2009 |
| 16 | WURGL | P IO / EVVR | NRW | ATV_EPOS_NRW | EPOS MS | Kessler | CD-MS | 0.5 | 10/1/2009 |
| 17 | WURGL | P IO / EVVR | NRW | ATV_EPOS_NRW | EPOS MS | Beckmann | CD-MS | 0.5 | 10/1/2009 |
| 18 | WURGL | P Flash | NRW | ATV_EPOS_NRW | EPOS MS | Lammers | CD-MS | 0.7 | 10/1/2009 |
| 19 | WURGL | P Flash | MUC | ATV_OPP_MUC_AT | FAG ATV A | Krug | PD-LMS | 0.25 | 10/1/2009 |
| 20 | WURGL | P Flash | NRW | ATV_EPOS_NRW | EPOS PS | Lotz | CD-MS | 0.25 | 10/1/2009 |
| 21 | WURGL | P Flash | NRW | ATV_EPOS_NRW | EPOS MS | Dollberg | CD-MS | 0.25 | 10/1/2009 |

METHOD, SOFTWARE AND COMPUTER SYSTEM FOR MANIPULATING AGGREGATED DATA

BACKGROUND

Project plans associated with a resource planning process in a multi-project environment are highly complex and typically hosted in a multi-dimensional database. For example, the plans may include fields such as organizational unit, project name, work package, skill, location, resource pool, employee, month, etc. and values associated with the fields for each record contained in the database. Each field in the database corresponds to a particular level of the project plan data. As such, the low-level source data can be presented at different levels using an appropriate software tool such as a spreadsheet to provide various aggregate views to the user. The low-level source data is manually entered and stored in the database and provides only a bottom-level view of the data. The data can be imported into the spreadsheet for viewing the data at a higher level.

A pivot tool is one such tool for enabling a user to view spreadsheet data in arbitrary aggregate views, i.e. at a higher level. 'Pivot tool' in this context refers to a data summarization tool which can sort, count, and total data stored in the spreadsheet and create a so-called pivot table for displaying the summarized data. Pivot tables are useful in presenting high level aggregate views of data such as project planning data or other types of data. However, the lower-level source data imported into the spreadsheet typically must be manually edited if changes are desired based on an analysis of the pivot table content. Manually editing highly detailed low-level data such as complex project planning data can require many hours of manual data manipulation. Also, several iterations of viewing the source data at a higher level using a pivot table and then manually re-editing the low-level data based on the summary provided by the pivot table may be required so that the low-level source data yields the desired high-level aggregate result.

For example, project managers typically manage low-level project planning data by alternating between two different tools in the planning and re-planning process. A data analysis tool is applied, to present a grouped (aggregated) top-down view of the low-level source data loaded from a database. A spreadsheet with a pivot tool add-in is conventionally used to generate an aggregate view of the data. The content of a pivot table can be analyzed with the goal of determining a top-down plan which is consistent with the boundary conditions of the project. A data editing tool such as a web-based editor utility is then applied to the low-level source data, enabling the user to manually enter all bottom-up plan details in a way that the total sums are consistent with the top-down plan view generated using the pivot tool. The editor utility allows data entering on the lowest detail level only. These steps are typically repeated several times to ensure data consistency, increasing cost and delay.

SUMMARY

According to an embodiment of a method of manipulating a collection of data including a plurality of records having values assigned to different fields, each field corresponding to an attribute of the data, the method includes importing the data into an application that displays the data and generating a first table via the application, the first table including content which summarizes at least a portion of the data based on one or more of the fields. The method further includes generating a second table from the first table, modifying content of the second table independent of the first table and automatically revising the data imported into the application based on the modifications made to the content of the second table so that the data imported into the application incorporates the modifications.

According to an embodiment of a computer system, the computer system includes a processing circuit operable to import a collection of data into an application. The data includes a plurality of records having values assigned to different fields, each field corresponding to an attribute of the data. The processing circuit is further operable to generate a first table via the application, the first table including content which summarizes at least a portion of the data based on one or more of the fields. The processing circuit is also operable to generate a second table from the first table, modify content of the second table independent of the first table and automatically revise the data imported into the application based on the modifications made to the content of the second table so that the data imported into the application incorporates the modifications.

According to an embodiment of a computer readable medium storing a computer program configured to manipulate a collection of data including a plurality of records having values assigned to different fields, each field corresponding to an attribute of the data, the computer program includes program instructions to import the data into an application that displays the data and program instructions to generate a first table via the application, the first table including content which summarizes at least a portion of the data based on one or more of the fields. The computer program further includes program instructions to generate a second table from the first table, program instructions to modify content of the second table independent of the first table and program instructions to automatically revise the data imported into the application based on the modifications made to the content of the second table so that the data imported into the application incorporates the modifications.

According to an embodiment of a method of manipulating a collection of project planning data including a plurality of records having values assigned to different fields, each field corresponding to an attribute of the project planning data, the method includes importing the project planning data from a database into a spreadsheet application for display by the spreadsheet application and generating a pivot table via the spreadsheet application, the pivot table displaying a summary of at least a portion of the project planning data based on one or more of the fields selected by a user of the spreadsheet application. The method further includes copying the content of the pivot table to an editable table, modifying the content of the editable table independent of the pivot table responsive to input received from the user, automatically revising the project planning data so that the values of the project planning data correspond to the modified content of the editable table, and automatically revising the content of the pivot table based on the revised project planning data so that the content of the pivot table corresponds to the modified content of the editable table.

According to an embodiment of a computer system, the computer system includes a processing circuit operable to import a collection of project planning data into a spreadsheet application. The project planning data includes a plurality of records having values assigned to different fields, each field corresponding to an attribute of the project planning data. The processing circuit is further operable to generate a pivot table via the spreadsheet application, the pivot table displaying a summary of at least a portion of the project planning data based on one or more of the fields selected by a user of the spreadsheet application, copy the content of the pivot table to an editable table, and modify the content of the editable table independent of the pivot table responsive to input received from the user. The processing circuit is also operable to automatically revise the project planning data so that the values of the project planning data correspond to the modified content of the editable table and automatically revise the content of the pivot table based on the revised project planning data so that the content of the pivot table corresponds to the modified content of the editable table.

Those skilled in the art will recognize additional features and advantages upon reading the following detailed description, and upon viewing the accompanying drawings.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIGS. 4-15 are screenshots showing various features of the data manipulation embodiments described herein;

DETAILED DESCRIPTION

Figure 1:
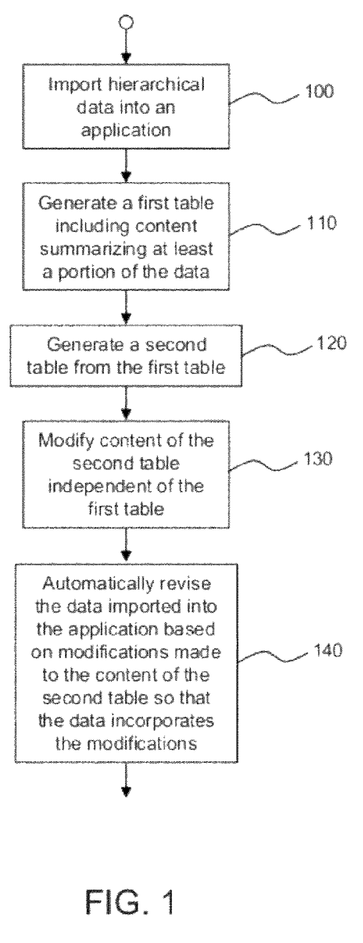
FIG. 1 shows a flow diagram of a method of manipulating aggregated data according to an embodiment.

FIG. 1 is a flow diagram illustrating an embodiment of a method for manipulating a collection of data. The collection of data includes a plurality of records having values assigned to different fields. Each field corresponds to an attribute of the data. For example, FIG. 4 shows one example of project planning data having fields such as Project Name, Work Package, Location, Pool, Dept, Last Name, Skill, MM (resource amount), Month, etc. and values associated with one or more fields for each record (row). Some fields may be disjoint i.e. unrelated e.g., such as Work Package and Skill. Other fields may have a hierarchical relationship i.e. a many-to-one (or one-to-many) relation e.g., such as Employee, Resource Pool and Location. Of course, additional and/or different fields may be provided, and the data may be for uses other than project planning such as sales data, scientific data, medical data, census data, etc. The exemplary fields and values shown in FIG. 4 are intended to provide a mere illustration of the types and hierarchical organization of data which can be manipulated by the embodiments described herein and should not be considered limiting in any way.

The data is imported into an application that displays the data (Step 100). For example, the application can be a spreadsheet application or any other type of application which can present the low-level (source) data to a user. The user decides how to aggregate the data by selecting the corresponding field(s). In response, a first table is generated via the application which includes content summarizing at least a portion of the data based on each field selected by the user (Step 110). In one embodiment, the first table is a pivot table generated using a pivot tool add-in available to the user of the application.

A second table is generated from the first table (Step 120). In one embodiment, the second table is generated by copying the first table. The content of the second table is modified independent of the first table (Step 130). For example, the content of the second table can be modified by the user adding a new data value to the second table, deleting a preexisting data value from the second table, changing a preexisting data value in the second table, creating a new record in the second table, and/or shifting a preexisting data value from one time-related field to a different time-related field e.g., by moving the data value from one month to a different month.

In each case, the low-level data imported into the application is automatically revised based on the modifications made to the content of the second table so that the low-level data incorporates the modifications (Step 140). As such, the user is not required to manually edit the low-level data in order to maintain coherent top-down and bottom-up representations of the data. Instead, the low-level source data is automatically revised based on the changes made to the content of the second table without manual editing. The values of the source data impacted by the modifications to the content of the second table are scaled in proportion to their original values based on the modifications so that matching values are calculated at the detailed level. In one embodiment, the user modifies an existing non-zero value and the system rescales the values of all associated detailed records. In another embodiment, the user adds a value at a coordinate where no value or zero sum previously existed and the system creates new detail records from candidate records found at adjacent neighbor positions e.g., on the time axis of the current coordinate. In yet another embodiment, the user moves a block of values along a time axis and the system replaces the time coordinate of all associated records without having to an implement a rescaling operation. These revision features and others are described in more detail later herein with reference to FIGS. 5-14.

To facilitate revising of the low-level source data imported into the application, the content of the second table can be linked to the corresponding content of the low-level data e.g., by processing the second table as an object and maintaining appropriate reference pointers between the content of the second table and the corresponding content of the low-level data. This way, the low-level data imported into the application can be automatically revised to incorporate the modifications made to the content of the second table based on the linking between the content of the second table and the corresponding content of the source data.

The content of the first table can also be automatically revised based on the modifications made to the content of the second table so that the content of the first table incorporates the modifications. For example, the first table can be a pivot table as explained above. According to this embodiment, the content of the pivot table is revised based on the modified source data. This way, the modifications made to the second table are viewable in the pivot table. In one embodiment, the revisions made to the content of the second (editable) table are highlighted e.g., by boldfacing, italicizing, underlining, and/or changing the color, font and/or size of the modified values so that the pivot table distinctly displays the modifications previously made by the user to the content of the table.

In addition or alternatively, an invalidated copy of the second table can be maintained after the data imported into the application is automatically revised based on the modifications made to the content of the second table. Each modification previously made to the content of the second table can be highlighted in the invalidated copy so that the user can readily track revisions previously made over a plurality of iterations.

Figure 2:
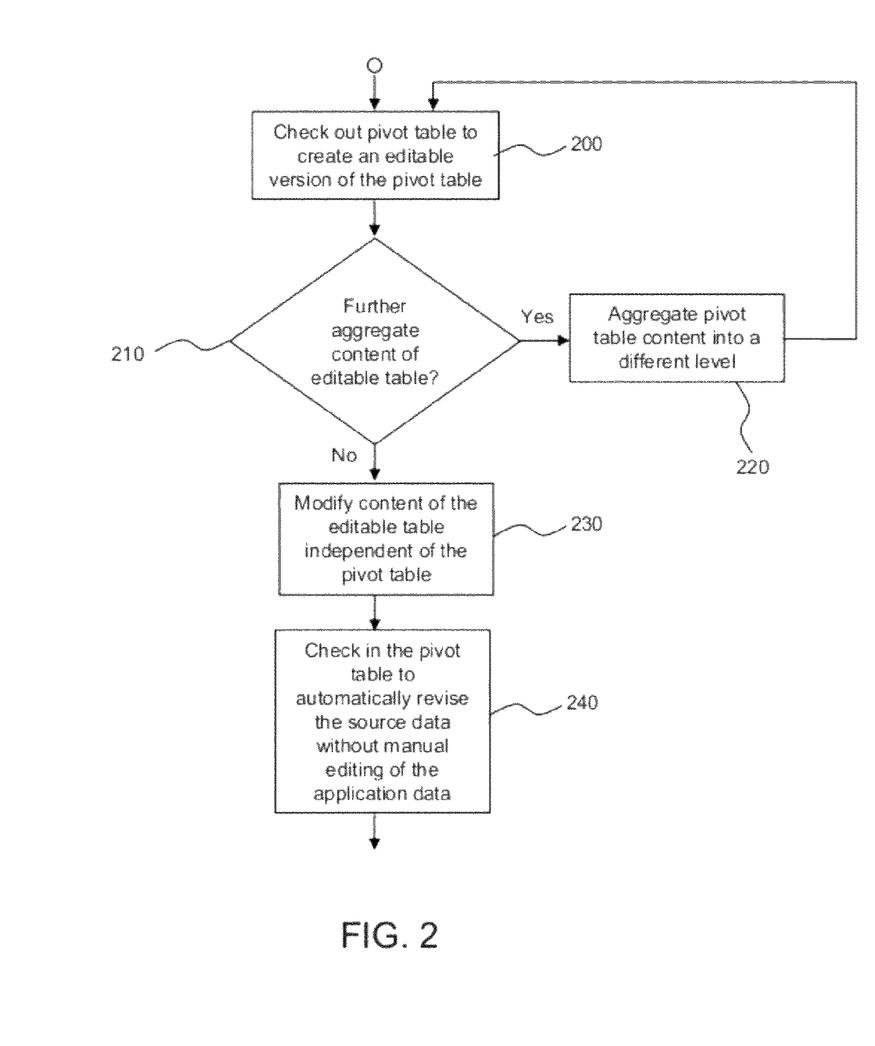
FIG. 2 shows a flow diagram of a method of manipulating aggregated data according to another embodiment.

FIG. 2 is a flow diagram illustrating an embodiment of generating the second table from the first table and modifying the content of the second table. According to this embodiment, the first table is a pivot table. The user creates the pivot table to yield a particular aggregate view of the low-level source data, and the pivot table is checked out from the application to create the second table (Step 200). The second table is a 1:1 shadow copy of the pivot table according to this embodiment. However, the second table is editable.

The user may determine to further aggregate the content of the editable table prior to editing the content (Step 210). That is, the user may wish to view the data at a different (higher or lower) level than what is presented in the pivot table. If so, the content of the editable table is aggregated into a higher or lower level than first displayed in the pivot table responsive to input received from the user (Step 220). For example, the user can re-arrange the pivot table as desired and then check-out the pivot table to further aggregate the content of the editable table. Otherwise, no further aggregation is performed.

The content of the editable table is modified independent of the pivot table responsive to input received from the user (Step 230). For example, the user can add a new data value to the editable table, deleting a preexisting data value, change a preexisting data value, create a new record, and/or shift a preexisting data value from one time-related field to a different time-related field. After editing the content as desired, the user checks in the pivot table. In response, the low-level data imported into the application is automatically revised based on the modifications made to the content of the editable table (Step 240). An optional step of requiring the user to verify whether the changes should be made can be provided. In either case, this embodiment enables the user to check out a pivot table, modify an editable shadow version of the pivot table created as part of the pivot table check-out process, and revise the low-level source data based on the changes made to the editable table by checking in the pivot table.

Figure 3:
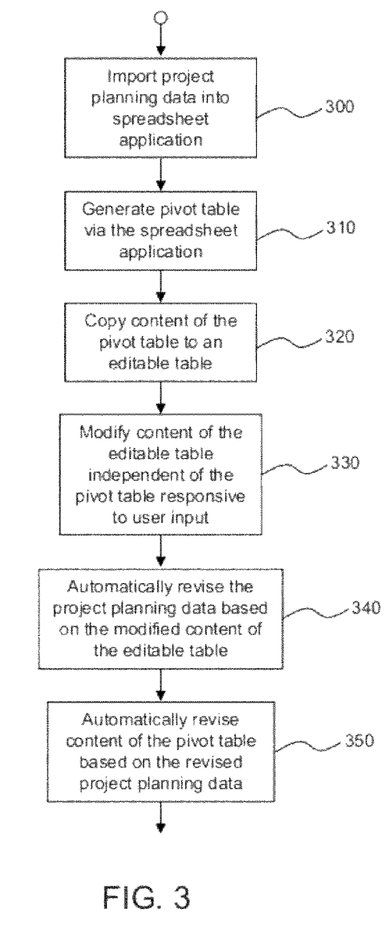
FIG. 3 shows a flow diagram of a method of manipulating aggregated data according to yet another embodiment.
Figure 5:
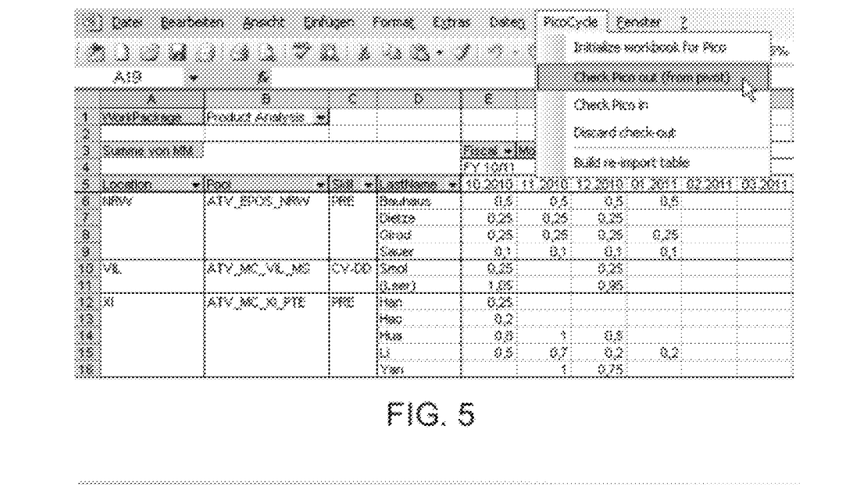

FIG. 3 is a flow diagram illustrating an embodiment of a method of manipulating a collection of project planning data including a plurality of records having values assigned to different fields, each field corresponding to an attribute of the project planning data. The method includes importing the project planning data from a database into a spreadsheet application which displays the data (Step 300) e.g., as shown in FIG. 4. A pivot table is then generated via the spreadsheet application which displays a summary of at least a portion of the project planning data based on one or more of the fields selected by a user of the spreadsheet application (Step 310). FIG. 5 shows an exemplary pivot table displaying values for the fields Location, Pool, Skill, Last Name, Fiscal Year and Month, including only a portion of the planning data i.e. generally filtered for WorkPackage='Product Analysis'. Of course, additional and/or different fields could be provided depending on the type of source data being analyzed.

Figure 6:
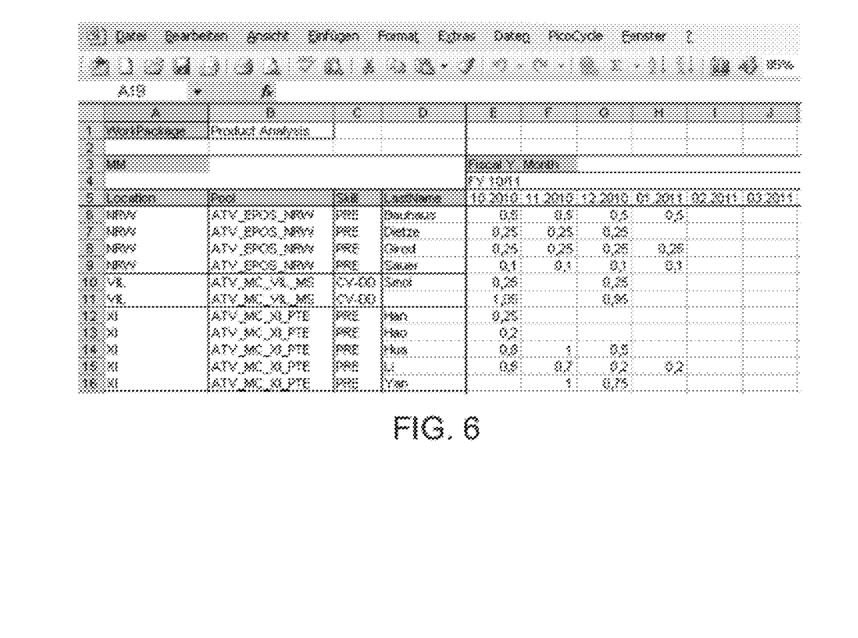
Figure 7:
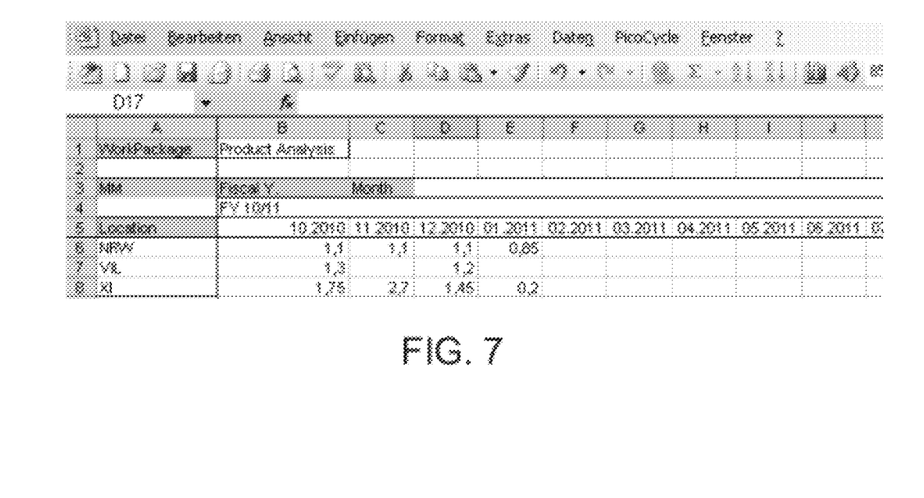

In each case, the content of the pivot table is copied to an editable table by checking out the pivot table (Step 320). FIG. 5 shows a drop-down menu available via the spreadsheet application which includes an option available to the user for checking-out the pivot table, the option being labeled 'Check Pico out (from pivot)' in FIG. 5, where 'Pico' is an acronym for 'pivot table checked out'. By selecting the check-out option, the editable shadow copy of the pivot table is created e.g., as shown in FIG. 6. Prior to modifying the editable table, the content of the editable table may optionally be further aggregated as explained previously herein with reference to Steps 210 and 220 of FIG. 2. FIG. 7 shows the exemplary editable table after further aggregation. In this purely illustrative example, the editable table is further aggregated by re-arranging the fields 'Pool', 'Skill' and 'lastName' off the pivot table (leaving only 'Location' in place) and checking-out again the pivot table. Accordingly, the content of the editable table is presented at a higher level than first displayed in the pivot table. Of course, the editable table can be aggregated based on additional and/or different fields or not further aggregated.

Figure 8:
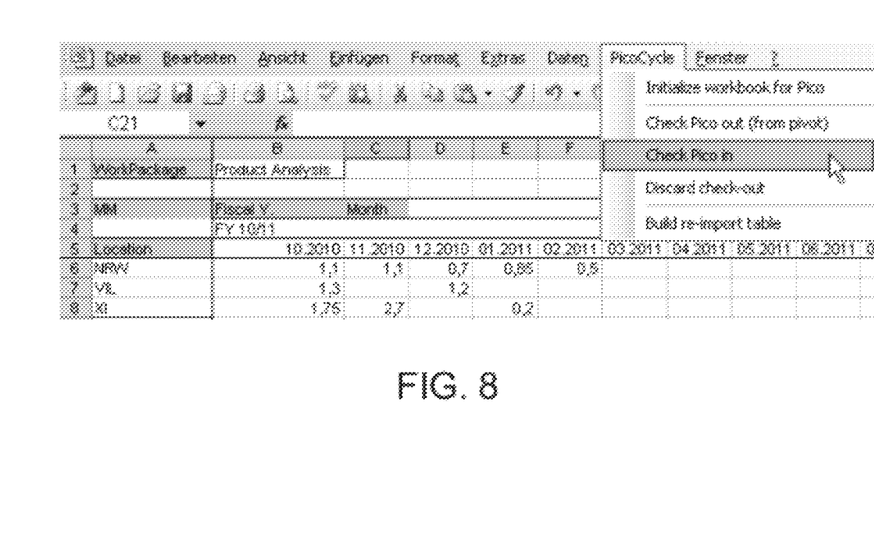
Figure 9:
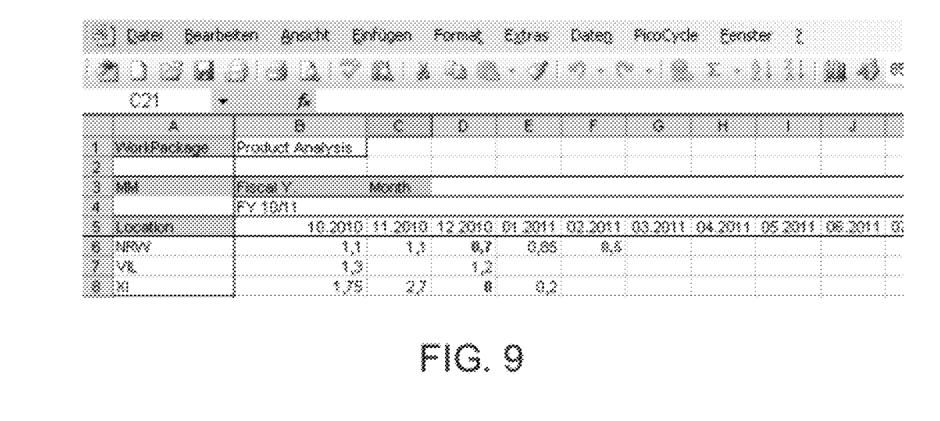
Figure 10:
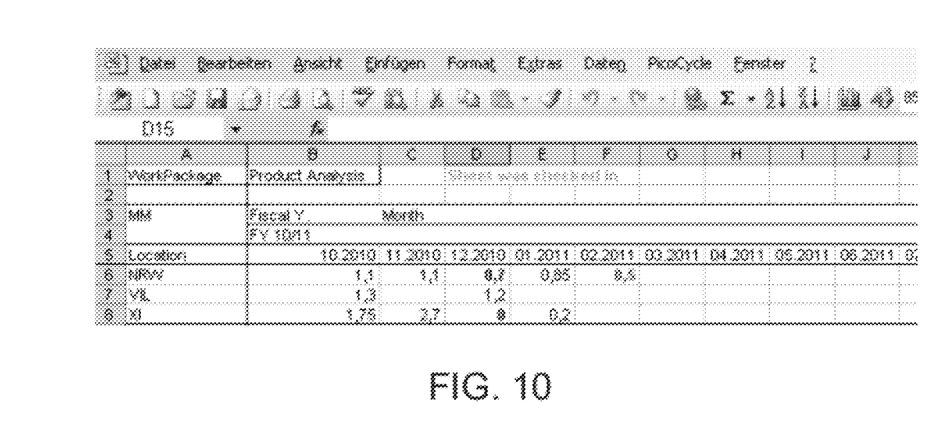

In each case, the content of the editable table is then modified independent of the pivot table responsive to input received from the user (Step 330). FIG. 8 shows the aggregated The pivot table is then checked-in by the user after the desired modifications are made to the content of the editable table. The modifications made to the content of the editable table can be made visible after pivot table check-in as previously explained herein e.g., as shown in FIG. 9. The user may be optionally asked whether corresponding modifications should be made to the low-level source data imported into the spreadsheet application as previously explained herein. Alternatively, the user may not be prompted and instead the changes are made responsive to the pivot table being checked in. In either case, the project planning data is automatically revised so that the values of the project planning data correspond to the modified content of the editable table (Step 340). This way, the user need not export the low-level data back to the database for manual editing, and then re-import the data to continue the analysis process. Instead, the low-level source data is automatically updated so that the user can readily continue working with the data in order to hone in on a desired outcome. An invalidated copy of the editable table can be maintained with each modification highlighted as previously explained herein e.g., as shown in FIG. 10.

Figure 11:
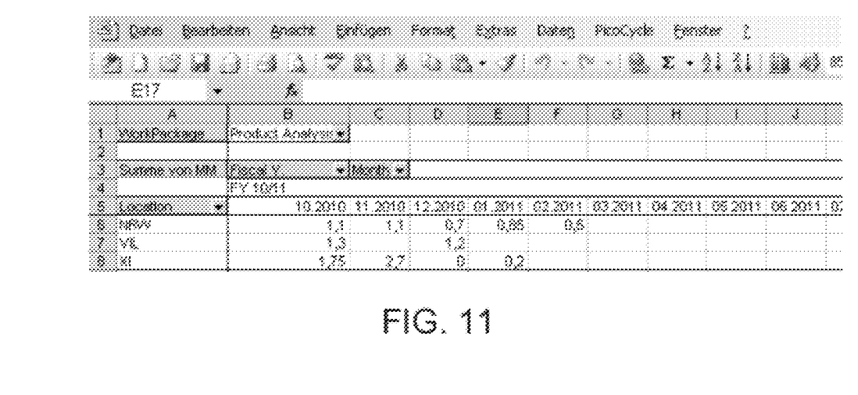
Figure 12:
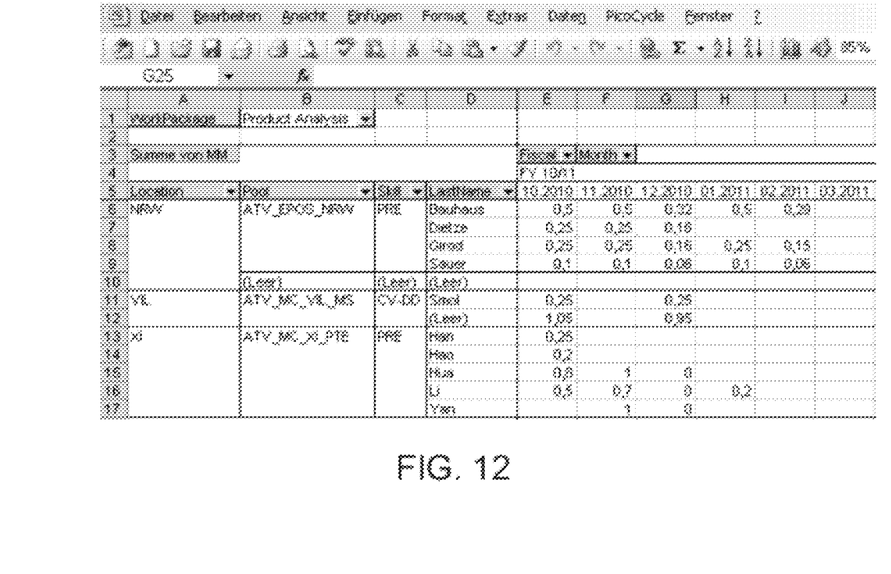

The content of the pivot table is also automatically revised based on the revised project planning data so that the content of the pivot table also corresponds to the modified content of the editable table (Step 350). When the user switches back to the pivot table, the corresponding modifications are displayed in the pivot table. FIG. 11 shows the revised pivot table at the higher aggregation level of the editable table (i.e. aggregated by the fields 'Location' and 'Month'). However, the content of the pivot table at the lower original aggregation level (i.e., aggregated by the fields 'Pool', 'Skill' and 'lastName') also displays the values affected by the prior modifications with proper scaling e.g., as shown in FIG. 12. In general, the pivot table displays the proper content at any level of aggregation post modification because the pivot table uses the low-level source data imported into the spreadsheet application, which is revised based on the modifications made to the content of the editable table as previously explained herein. Accordingly, the pivot table accesses updated and properly scaled low-level source data. For example, the value for location 'NRW' was changed from 1.1 to 0.7 for the month of '12.2010' in the example given above. This change was proportionally scaled down to all employees (Bauhaus, Dietze, Girod and Sauer) for this location as shown in FIG. 12 so that the resource totals for these employees at location 'NRW' totals 0.7 instead of 1.1 for the month '12.2010'. Likewise, all values for location 'XI' were deleted from Month '12.2010' and the new 'NRW' Location value for Month '02.2011' was proportioned over the three employees for this location according to the template found in Month '01.2011'.

The scaling operations described herein can be configured for a certain limited accuracy e.g., to a certain number of decimal places, avoiding endless digit chains in the low-level source data after modification. Certain rescaling operations e.g., 1 divided by 3 can yield a result which extends beyond the set limit. However, the result can be rounded in accordance with the limit. Doing so can lead to a deviation between the edited aggregate value and the total of associated low-level records. This data discrepancy can be alleviated by using the low-level record with the highest value for final compensation such that the total of all associated low-level records exactly matches the edited aggregate value. Such scaling and compensation is implicit in FIG. 12 which displays the lower-level data after the new value 0.5 is added for Location 'NRW' and Month '02.2011' via the editable table as shown in FIG. 11. In the example of FIG. 12, employee 'Bauhaus' was used for final compensation. The corresponding record is therefore assigned the value 0.29 for employee 'Bauhaus' while the source template records for Month '01.2011' would suggest a "doubled Girod" i.e. 0.30. In other embodiments, no rounding of values is performed.

Figure 13:
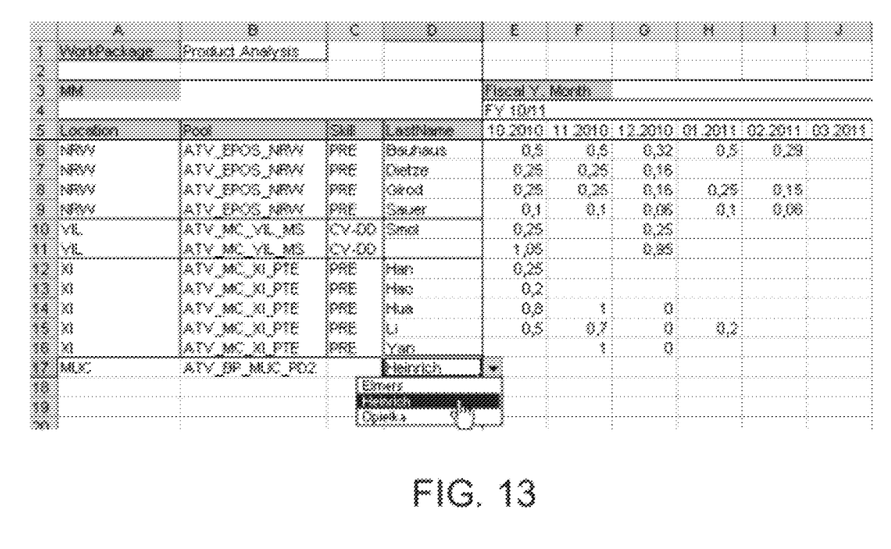

Missing values can be added e.g., via dropdown lists when new records are added during modification, resulting in corresponding new records being added to the low-level source data after pivot table check in. For example, FIG. 13 shows a new record (row 17) added to the editable table during the modification process. This record did not previously exist in the low-level data imported into the spreadsheet application. However, preexisting fields available in the original source data can be provided e.g., via pull-down windows as shown in FIG. 13 to populate the new record with pertinent data values. After check-in, the new record is added as a new row in the low-level source data. In one embodiment, the values offered in the dropdown lists are read from catalogue tables imported into the application in parallel with the pivot source table. As such, pertinent values can be added even if not yet included in the low-level source data.

Figure 15:
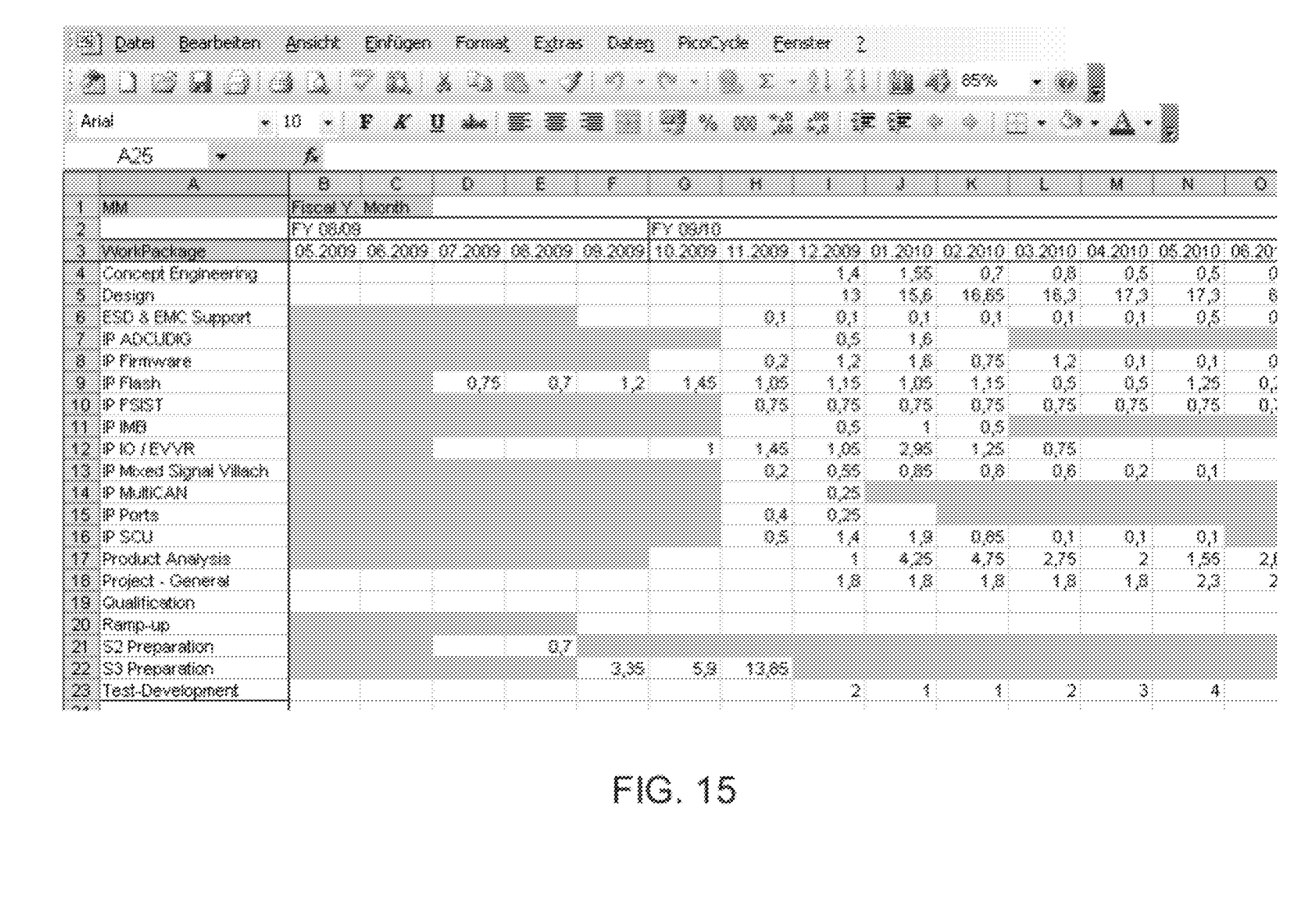

An additional feature can be provided by which the values of particular fields for certain time periods can be blocked off from editing or at least highlighted during the modification process to alert the user. FIG. 14 shows a pull-down menu available in the spreadsheet application with a 'Toggle time span markers' option. When this optional feature is selected by the user, blocked off time regions in the editable table are shown. This feature is particularly useful for project planning data where a particular work package may not be in existence at a particular point in time or may have already concluded, and therefore modifying related data values in these sections of the editable table is not beneficial or meaningful to the project planning process. FIG. 15 shows the editable table with certain regions blocked-off (shaded) to indicate these values should not be modified. In another embodiment, gaps on the time axis in the pivot table can be bridged by adding dummy (artificial) records to the low-level source data.

Figure 16:
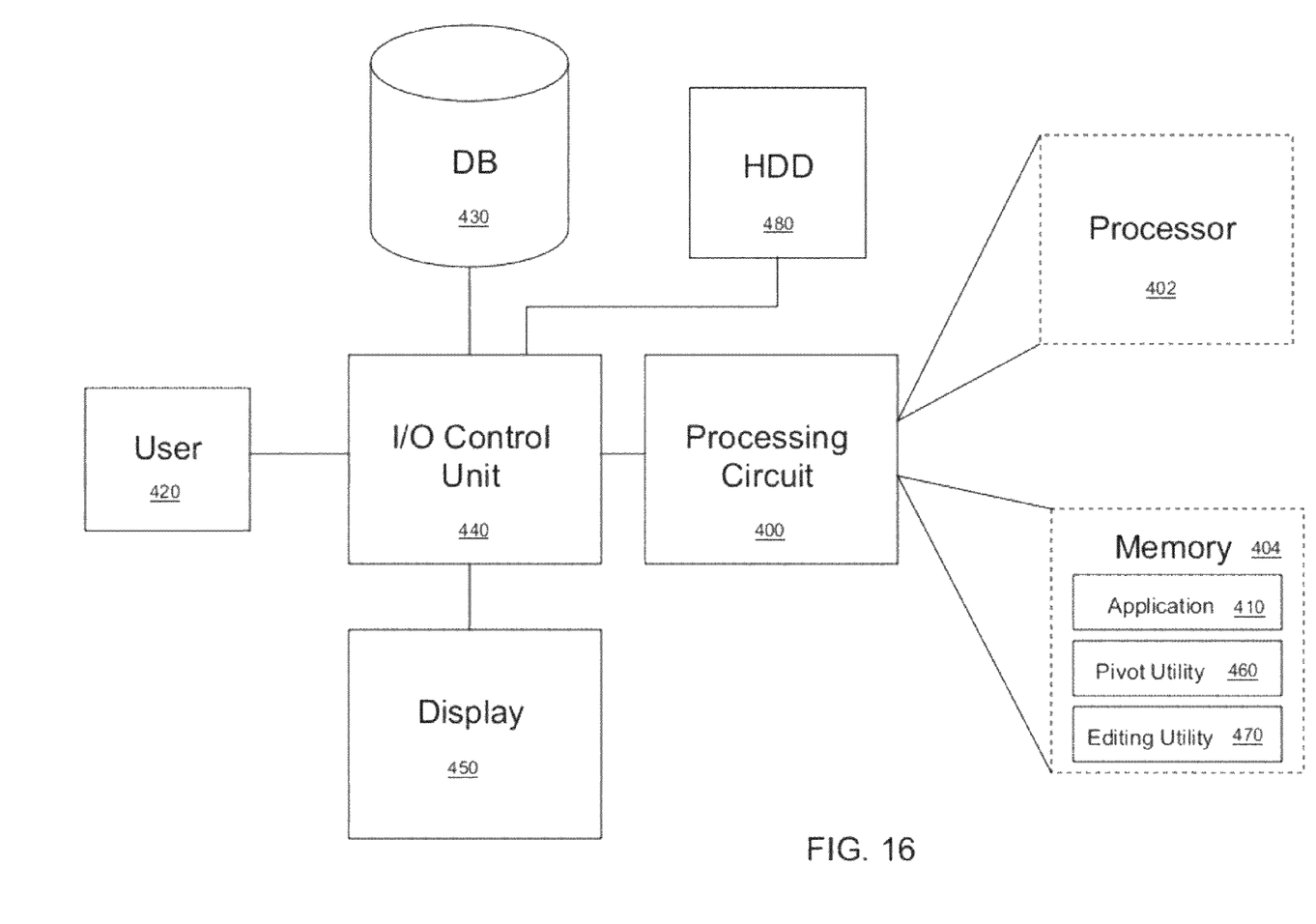
FIG. 16 shows a schematic block diagram of a computer system for manipulating aggregated data.

FIG. 16 illustrates a block diagram of a computer system which includes a processing circuit 400 for implementing the various data manipulation embodiments previously described herein. According to one embodiment, the processing circuit 400 includes a processor 402 and memory 404. The processing circuit 400 imports a collection of data into an application 410 such as a spreadsheet application or other type of application for viewing and analyzing the data by a user 420. The data includes a plurality of records having values assigned to different fields, each field corresponding to an attribute of the data.

The data can be imported from a database 430 which may be external or internal to the computer system. For example, the database 430 may be remote from the computer system and the user 420 reserves a copy of the low-level data from the database 430. The computer system includes a conventional input/output (I/O) control unit 440 for accessing the database 430. If the database 430 is external to the computer system, the I/O control unit 440 can include a network adapter for controlling access to the remote database 430 e.g., via the Internet. If the database 430 is internal to the computer system, the I/O control unit 440 can include a bus controller for managing the transfer of data between the internal database 430 and the processing circuit 400.

In either case, the low-level source data exported from the database 430 can be stored in the memory 404. All or part of the application code 410 can also be loaded into the memory 404 for execution by the processor 402 so that the application is visible to the user 420 via a display 450, and the I/O control unit 440 can include a display adapter for managing the transfer of signals to the display 450. The memory 404 can store pivot utility code 460 which can be executed by the processor 402 to provide a utility which enables the user 420 to view the low-level source data in an aggregated manner as previously explained herein. The memory 404 can also store editing utility code 470 which can be executed by the processor 402 to provide a utility for modifying aggregated data also as previously explained herein. All of the code can be stored in a hard disk drive (HDD) 480 coupled to the processing circuit 400 via the I/IO control unit 440 and loaded into the memory 404 by the processor 402 as needed in response to user input. The memory 404 and the hard disk drive 480 therefore store the application and utility code 410, 460 and 470 as a computer program.

The processor 402 can execute the code 410, 460 and 470 stored in the memory 404 to display the application and related utilities on the display 450 for the user 420. In one embodiment, the processing circuit 400 generates a first table such as a pivot table via the application in response to user input via the I/O control unit 440. The first table is visible on the display 450 and includes content which summarizes at least a portion of the data based on one or more fields selected by the user 420 e.g., as shown in FIG. 5. The processing circuit 400 also generates a second table from the first table e.g., as shown in FIG. 6. The second table can be generated by checking out the first table as previously described herein. The second table is an editable shadow copy of the first table and is visible on the display 450.

The processing circuit 400 modifies the content of the second table independent of the first table responsive to input received from the user 420 via the I/O control unit 440 e.g. as shown in FIG. 8. The user 420 can add a new data value to the second table, delete a preexisting data value, change a preexisting data value, create a new record, shift a preexisting data value from one time-related field to a different time-related field, etc. After the user 420 finishes modifying the content, the processing circuit 400 automatically revises the data imported into the application based on the modifications made to the content of the second table so that the low-level source data incorporates these modifications. The content of the pivot table can also be automatically revised based on the revised low-level source data e.g. as shown in FIG. 12.

Terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method of manipulating a collection of data including a plurality of records having values assigned to different fields, each field corresponding to an attribute of the data, the method comprising:
    importing the data into an application that displays the data;
    generating a first table via the application, the first table including content which summarizes at least a portion of the data based on one or more of the fields;
    generating a second table from the first table, responsive to a user of the application checking out the first table by selecting a check-out option in the application;
    modifying content of the second table independent of the first table, such that modifications made to the content of the second table are not incorporated into the imported data or into the first table while the first table remains checked out; and
    automatically revising the data imported into the application, responsive to the user checking in the first table by selecting a check-in option in the application, wherein said revising is based on the modifications made to the content of the second table so that the data imported into the application incorporates the modifications.

2. The method of claim 1, wherein the first table is a pivot table.

3. The method of claim 1, wherein generating the second table from the first table comprises:
    copying the content of the first table to form the second table; and
    linking the content of the second table to corresponding content of the data imported into the application.

4. The method of claim 3, wherein the data imported into the application is automatically revised to incorporate the modifications made to the content of the second table based on the linking between the content of the second table and the corresponding content of the data imported into the application.

5. The method of claim 1, wherein modifying the content of the second table independent of the first table comprises creating a new record in the second table.

6. The method of claim 1, further comprising automatically revising the content of the first table based on the modifications made to the content of the second table so that the content of the first table incorporates the modifications.

7. The method of claim 1, further comprising aggregating the content of the second table into a higher level than first displayed in the first table prior to modifying the content of the second table.

8. The method of claim 1, further comprising maintaining an invalidated copy of the second table after the data imported into the application is automatically revised based on the modifications made to the content of the second table, the invalidated copy highlighting each modification previously made to the content of the second table.

9. A computer system comprising a processing circuit operable to:
    import a collection of data into an application, the data including a plurality of records having values assigned to different fields, each field corresponding to an attribute of the data;
    generate a first table via the application, the first table including content which summarizes at least a portion of the data based on one or more of the fields;
    generate a second table from the first table, responsive to a user of the application checking out the first table by selecting a check-out option in the application;
    modify content of the second table independent of the first table, such that modifications made to the content of the second table are not incorporated into the imported data or into the first table while the first table remains checked out; and
    automatically revise the data imported into the application, responsive to the user checking in the first table by selecting a check-in option in the application, wherein said revising is based on the modifications made to the content of the second table so that the data imported into the application incorporates the modifications.

10. The computer system of claim 9, wherein the first table is a pivot table.

11. The computer system of claim 9, wherein the processing circuit is operable to generate the second table from the first table by copying the content of the first table to form the second table and linking the content of the second table to corresponding content of the data imported into the application.

12. The computer system of claim 11, wherein the processing circuit is operable to automatically revise the data imported into the application to incorporate the modifications made to the content of the second table based on the linking between the content of the second table and the corresponding content of the data imported into the application.

13. The computer system of claim 9, wherein the processing circuit is operable to modify the content of the second table independent of the first table by creating a new record in the second table.

14. The computer system of claim 9, wherein the processing circuit is operable to automatically revise the content of the first table based on the modifications made to the content of the second table so that the content of the first table incorporates the modifications.

15. The computer system of claim 9, wherein the processing circuit is operable to aggregate the content of the second table into a higher level than first displayed in the first table prior to modifying the content of the second table.

16. The computer system of claim 9, wherein the processing circuit is operable to maintain an invalidated copy of the second table after automatically revising the data imported into the application, the invalidated copy highlighting each modification previously made to the content of the second table.

17. The computer system of claim 9, wherein the processing circuit comprises a processor and memory.

18. A non-transitory computer readable medium storing a computer program configured to manipulate a collection of data including a plurality of records having values assigned to different fields, each field corresponding to an attribute of the data, the computer program comprising:
    program instructions to import the data into an application that displays the data;
    program instructions to generate a first table via the application, the first table including content which summarizes at least a portion of the data based on one or more of the fields;
    program instructions to generate a second table from the first table, responsive to a user of the application checking out the first table by selecting a check-out option in the application;
    program instructions to modify content of the second table independent of the first table, such that modifications made to the content of the second table are not incorporated into the imported data or into the first table while the first table remains checked out; and program instructions to automatically revise the data imported into the application, responsive to the user checking in the first table by selecting a check-in option in the application, wherein said revising is based on the modifications made to the content of the second table so that the data imported into the application incorporates the modifications.

19. A method of manipulating a collection of project planning data including a plurality of records having values assigned to different fields, each field corresponding to an attribute of the project planning data, the method comprising:

importing the project planning data from a database into a spreadsheet application for display by the spreadsheet application;

generating a pivot table via the spreadsheet application, the pivot table displaying a summary of at least a portion of the project planning data based on one or more of the fields selected by a user of the spreadsheet application;

copying the content of the pivot table to an editable table, responsive to a user of the application checking out the pivot table by selecting a check-out option in the spreadsheet application;

modifying the content of the editable table independent of the pivot table responsive to input received from the user, such that modifications made to the content of the editable table are not incorporated into the project planning data or into the pivot table while the pivot table remains checked out;

automatically revising the project planning data, responsive to the user checking in the pivot table by selecting a check-in option in the spreadsheet application, so that the values of the project planning data correspond to the modified content of the editable table; and automatically revising the content of the pivot table based on the revised project planning data so that the content of the pivot table corresponds to the modified content of the editable table.

20. The method of claim 19, further comprising highlighting the revisions made to the content of the pivot table so that the pivot table distinctly displays the modifications made by the user to the content of the editable table.

21. The method of claim 19, further comprising exporting the revised project planning data to the database so that the values of the project planning data stored by the database correspond to the modified content of the editable table.

22. A computer system comprising a processing circuit operable to:

import a collection of project planning data into a spreadsheet application, the project planning data including a plurality of records having values assigned to different fields, each field corresponding to an attribute of the project planning data;

generate a pivot table via the spreadsheet application, the pivot table displaying a summary of at least a portion of the project planning data based on one or more of the fields selected by a user of the spreadsheet application;

copy the content of the pivot table to an editable table, responsive to a user of the application checking out the pivot table by selecting a check-out option in the spreadsheet application;

modify the content of the editable table independent of the pivot table responsive to input received from the user, such that modifications made to the content of the editable table are not incorporated into the project planning data or into the pivot table while the pivot table remains checked out;

automatically revise the project planning data, responsive to the user checking in the pivot table by selecting a check-in option in the spreadsheet application, so that the values of the project planning data correspond to the modified content of the editable table; and automatically revise the content of the pivot table based on the revised project planning data so that the content of the pivot table corresponds to the modified content of the editable table.

23. The computer system of claim 22, wherein the processing circuit is operable to generate the editable table from the pivot table responsive to the user checking out the pivot table by selecting a check-out option in the spreadsheet and automatically revise the project planning data based on the modified content of the editable table responsive to the user checking in the pivot table by selecting a check-in option in the spreadsheet application.

* * * * *